Patented Sept. 2, 1930

1,775,014

UNITED STATES PATENT OFFICE

ROY L. ADAMS, OF SCHENECTADY, NEW YORK, ASSIGNOR TO GENERAL ELECTRIC COMPANY, A CORPORATION OF NEW YORK

HARD METALLIC COMPOSITION

No Drawing. Application filed July 31, 1929. Serial No. 382,593.

My invention relates broadly to hard metallic compositions and particularly to an improved method of making metallic compositions of the type set forth in the patent to Karl Schröter, 1,549,615, granted Aug. 11, 1925, and in the application of Karl Schröter, Serial No. 104,613, filed April 26, 1926, now Patent No. 1,721,416, granted July 16, 1929, and assigned to the same assignee as the present application.

In general, the metallic composition of the Schröter patents consists of a carbide of an element of the sixth group in the Mendelejeff Periodic System of Elements, together with an auxiliary metal of the iron group in this periodic system. Preferably tungsten carbide with about 3 to about 20 to 25% of cobalt is employed. The product contains ordinarily about 6 to about 15% cobalt with the remainder tungsten carbide and is in the form of a sintered product, the sintering taking place at about 1375° to about 1425° C., depending upon the percent of cobalt in the composition and the time of sintering.

I have discovered an improved method whereby I can produce a metallic composition of the character set forth such that the finished product will be dense and homogeneous and at the same time very hard.

In carrying out my invention the desired amount of carbon is first fired in a hydrogen furnace at about 1500° C. for about four hours. Lampblack is preferably used and the heating in hydrogen is to remove any impurities which may be removed by heat. Finely powdered tungsten oxide and the fired carbon are roughly mixed by hand stirring. An example of the proportions which may be used is: 1280 grams of tungsten oxide to 136 grams of carbon. This dry mixture of tungsten oxide and carbon is now stirred into a solution of cobalt acetate in distilled water. The reason that the carbon is first mixed with the tungsten oxide is that by so doing it will be wet by water. When the above proportions of oxide and carbon are used, 640 grams of cobalt acetate and two liters of water are employed.

This wet mixture is evaporated to dryness in the open air and the heating continued until the cobalt acetate is broken down to the oxide. The resulting powder, which is an intimate mixture of tungsten oxide, cobalt oxide, and carbon, is placed in a graphite crucible and then fired in a hydrogen furnace at about 1150° C. for about four hours. This temperature should be held quite accurately, the limits being 1125° C. minimum, to 1175° C. maximum.

After firing, the mixture is ready for pressing and final sintering. This may be done either by carrying out the pressing and sintering simultaneously or in separate steps.

What I claim as new and desire to secure by Letters Patent of the United States, is:

1. The process of making a metal composition which comprises introducing a dry mixture of carbon and an oxide of a metal of the sixth group in the Mendelejeff Periodic System of Elements into an aqueous solution of a compound of a metal of the iron group in said system which compound is easily decomposable by heat to the oxide, heating the mixture in air to decompose the compound, firing the mass so obtained in a reducing atmosphere, and pressing and sintering the fired mass.

2. The process of making a metal composition which comprises introducing a dry mixture of carbon and an oxide of a metal of the sixth group in the Mendelejeff Periodic System of Elements into an aqueous solution of a compound of a metal of the iron group in said system which compound is easily decomposable by heat to the oxide, heating the mixture in air to decompose the compound, and firing the mass so obtained in a reducing atmosphere.

3. The process of making a metal composition which comprises introducing a dry mixture of carbon and tungsten oxide into an aqueous solution of cobalt acetate, heating the mixture in air to decompose the cobalt acetate, firing the mass so obtained in a reducing atmosphere, and pressing and sintering the fired mass.

4. The process of making a metal composition which comprises introducing a dry mixture of carbon and tungsten oxide into an aqueous solution of cobalt acetate, heating the mixture in air to decompose the cobalt acetate, and firing the mass so obtained in a reducing atmosphere.

5. The process of making a dense, hard, homogeneous metallic composition which consists in mixing fired carbon with tungsten oxide, introducing this mixture into an aqueous solution of cobalt acetate, drying the mixture, heating the mass until the cobalt acetate is decomposed to cobalt oxide, firing the resulting mass in a hydrogen atmosphere at about 1150° C. for about four hours, then pressing and sintering.

In witness whereof, I have hereunto set my hand this 30th day of July, 1929.

ROY L. ADAMS.